United States Patent [19]

Limbrick

[11] Patent Number: 4,770,581
[45] Date of Patent: Sep. 13, 1988

[54] EXPANSION ANCHOR

[75] Inventor: Robert W. Limbrick, Bewdley, England

[73] Assignee: Dom Holdings PLC, Herts., England

[21] Appl. No.: 795,491

[22] PCT Filed: Feb. 28, 1985

[86] PCT No.: PCT/GB85/00076

§ 371 Date: Dec. 19, 1985

§ 102(e) Date: Dec. 19, 1985

[87] PCT Pub. No.: WO85/03984

PCT Pub. Date: Sep. 12, 1985

[30] Foreign Application Priority Data

Mar. 1, 1984 [GB] United Kingdom ............... 8405402

[51] Int. Cl.$^4$ ........................................... F16B 13/06
[52] U.S. Cl. ........................................ 411/50; 411/57
[58] Field of Search .............. 411/24, 25, 26, 27, 411/28, 29, 30, 45, 50, 53, 55, 32, 57, 62

[56] References Cited

U.S. PATENT DOCUMENTS

| 570,786 | 11/1896 | Church | 411/24 |
|---|---|---|---|
| 3,760,802 | 9/1973 | Fischer et al. | 411/50 X |
| 3,911,782 | 10/1975 | Liebig | |
| 3,974,734 | 8/1976 | Mächtle | |
| 4,100,934 | 7/1978 | Harris | |
| 4,447,182 | 5/1984 | Murbach | 411/45 |
| 4,478,542 | 10/1984 | Whelan, Jr. | 411/26 |
| 4,484,848 | 11/1984 | Ott | 411/24 |
| 4,485,847 | 12/1984 | Wentz et al. | 411/24 X |
| 4,537,541 | 8/1985 | Giannuzzi | 411/55 |
| 4,613,264 | 9/1986 | McIntyre et al. | 411/55 |
| 4,650,384 | 3/1987 | McIntyre et al. | 411/50 X |

FOREIGN PATENT DOCUMENTS

| 280322 | 1/1965 | Australia | 411/24 |
|---|---|---|---|
| 66537 | 9/1975 | Australia | |
| 835521 | 4/1952 | Fed. Rep. of Germany | |
| 2114036 | 10/1972 | Fed. Rep. of Germany | |
| 2150572 | 4/1973 | Fed. Rep. of Germany | 44/55 |
| 2431617 | 2/1975 | Fed. Rep. of Germany | |
| 2714547 | 10/1978 | Fed. Rep. of Germany | 411/24 |
| 2233518 | 1/1976 | France | |
| 2321065 | 3/1977 | France | |
| 2341772 | 6/1977 | France | |
| 2362299 | 3/1978 | France | |
| 480854 | 1/1968 | Switzerland | 411/55 |
| 1020865 | 2/1966 | United Kingdom | |
| 1113394 | 5/1968 | United Kingdom | |
| 1217850 | 12/1970 | United Kingdom | |
| 1222557 | 2/1971 | United Kingdom | |
| 1365467 | 9/1974 | United Kingdom | |
| 1386361 | 3/1975 | United Kingdom | |
| 1538401 | 1/1979 | United Kingdom | |
| 2094919A | 9/1982 | United Kingdom | |
| 2120348A | 11/1983 | United Kingdom | |

*Primary Examiner*—Lloyd A. Gall
*Attorney, Agent, or Firm*—Shapiro and Shapiro

[57] ABSTRACT

A unitary thick walled spacer S supports an anchor rod (15) for engagement in an expansion body (6). The tubular spacer S has a first part P of greater diameter than its remaining part P', with the part P' in slide fit engagement in the expansion sleeve (1), and the part P abutting, at its free end, a washer (17) and the head of the anchor rod (15). An annular rim M formed between the parts P and P' of the spacer S, is arranged, prior to use, a distance X from the expansion sleeve (1). As clamping down is performed in a receiving socket, the spacer part P' slides inside the expansion sleeve so progressively closing the gap X. The arrangement is so designed that in any particular application, the rim M at most just barely comes into contact with the expansion sleeve (1) so avoiding uselessly and detrimentally loading the spacer S.

4 Claims, 1 Drawing Sheet

EXPANSION ANCHOR

FIELD OF THE INVENTION

The present invention relates to an expansion anchor for setting in a receiving socket.

BACKGROUND ART

Such expansion anchors are normally internally threaded for engagement by a threaded anchor bolt. The expansion anchor itself generally comprises an expansion body on which is mounted an expansible body which can be expanded into gripping contact with the receiving socket by means of the expansion body being drawn within the sleeve by the threaded anchor being turned in the expansion body.

An expansion anchor is known which is provided with an expansible sleeve mounted on a waisted portion of an internally threaded tubular body between two abutments, one of which is tapered to provide a wedging effect when the tubular body is drawn axially of the sleeve by a threaded anchor bolt, to expand the sleeve into gripping contact with the receiving socket.

These prior known expansion anchors lack versatility of application and their manufacture tends to be a costly procedure and unnecessarily complicated.

SUMMARY OF THE INVENTION

It is an object of the invention amongst other things to provide an expansion anchor which by its less complicated design is cheaper to manufacture than the prior art device, and is more readily adaptable for use in achorage fixings where high shear loads and vibrational forces are to be encountered and which the fixing has to be designed to withstand.

According to one aspect of the invention there is provided an expansion anchor for setting in a receiving socket comprising a tubular expansion sleeve, a plurality of longitudinally arranged slits or slots in the body of the sleeve to provide an expansible forward region thereof, a threaded expansion body which can be drawn within the sleeve to expand said front region by a threaded anchor rod to set the anchor, and a unitary tubular support member telescopically engaged within a rearward region of the sleeve for supporting the shank of said anchor rod passing through the sleeve.

The expansion anchor as above defined is particularly useful in applications where high shear loads and vibrational forces are to be encountered.

To this end the tubular support member may constitute a spacer element between the tubular sleeve and the anchor rod threadedly engaged in the expansion body.

Thus as the anchor rod is torqued up to the set position in a receiving socket, the spacer element moves within the tubular sleeve to eventually contact or substantially contact the expansion body which itself is being pulled within the tubular sleeve to effect expansion thereof.

The relative dimensions of the component parts may be such that in the fully set condition, with an object to be clamped pulled hard against the receiving surface, the space between the body and the anchor rod and the tubular sleeve is occupied by the support member and the expansion body thus imparting rigidity to the structure.

Moreover, in reaching this condition none of the applied torque goes to uselessly loading the tubular sleeve because the head of the anchor rod continues moving relative to the expansion body up to the fully set position of the anchor. That is, prior to the set position such relative movement is not impeded by contact between the head of the anchor rod and the tubular sleeve.

Other features and advantages of the present invention will become apparent from the description that follows.

BRIEF DESCRIPTION OF THE DRAWINGS

The invention will now be described by way of example with reference to the accompanying drawings wherein.

BEST MODES OF CARRYING OUT THE INVENTION

Figure 1:
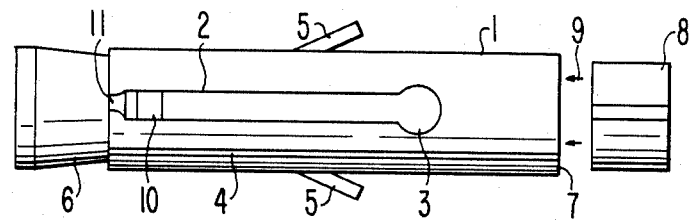
FIG. 1 is a side view of an expansion anchor according to one embodiment of the invention.

The expansion anchor shown in FIG. 1 comprises a tubular sleeve 1 provided with longitudinally extending slits or slots 2 of keyhole shape—that is, opened out at their extremities 3 along the body of the sleeve 1. Slits 2 facilitate expansion of the sleeve, as will be described.

The sleeve 1 is longitudinally split at 4 and is provided with anti-rotation lugs 5 on its outer surface.

The longitudinally arranged slits or slots provide an expansible forward region of the sleeve 1 which is expanded by an expansion body 6 retained on the sleeve 1. The expansion body 6 is tapered as shown, the direction of taper being towards the sleeve 1 so that as the expansion body 6 is pulled or pushed within the sleeve 1 it expands the forward region thereof.

The expansion body 6 is internally threaded to receive the threaded end of an anchor bolt (not shown in FIG. 1) which can be passed through the sleeve via its rearward end 7. The shank of the anchor bolt is supported at the rearward end of the sleeve 1 by a split support collar 8 which is assembled with the sleeve 1 by being press-fit into the sleeve in the direction of the arrows 9.

The expansion body 6 is provided with one or more lugs 10 at its minimum diameter of taper and these lugs 10 slidably engage the slits or slots 2, as shown.

The entrance portions of the slits or slots 2 are narrowed at 11 to retain the lugs within the slots or slits in the unexpanded condition of the sleeve 1, and thereby to retain the expansion body 6 in assembly.

Figure 2:
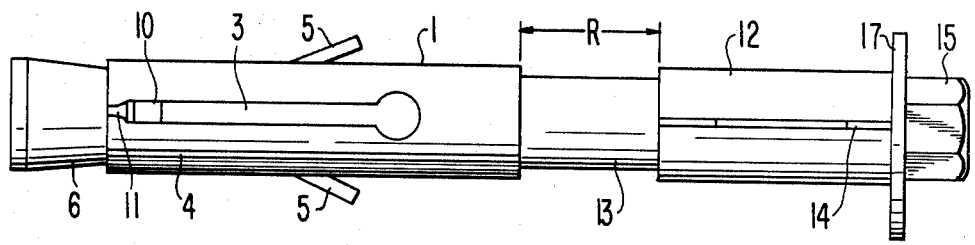
FIG. 2 is a side view of an anchor rod in combination with the expansion anchor of FIG. 1 according to another embodiment of the invention.

The modification shown in FIG. 2 is designed to allow the expansion anchor of FIG. 1 to be lengthened in order to permit deeper setting within a receiving socket or to allow a part of the expansion anchor to be received within an object being clamped to the receiving material by the anchor-engaging bolt.

In this embodiment a longitudinally split outer sleeve 12 of the same diameter as the sleeve 1 is coupled to sleeve 1 by means of a tubular support member 13 having one end press-fit inserted in the rearward region of the sleeve 1 and the other end within the outer sleeve 12 to permit relative movement between the sleeves.

The other end of the outer sleeve 12 is provided with an internal collar 14 which is in press-fit engagement with the internal surface of the sleeve 12.

An anchor rod 15 passes through both sleeves 1 and 12, collar 14 and support member 13, and has a threaded end which engages the expansion body 6.

The assembly of the parts of the embodiment of FIG. 2 is such that prior to, installation thereof, the sleeve 12 is in abutment with a washer 17 at the head of the rod 15, the sleeves 1 and 12 are spaced apart by a distance R and the lugs 10 of the expansion body 6 are against the restricted entrance portions of the slots or slits 2.

With the arrangement as described inserted in a receiving socket in bare material, the anchor rod 15 is turned in the expansion body 6 which is then drawn axially within the sleeve 1 to expand the latter into engagement with the receiving socket. During this movement the sleeve 12 moves axially over the linking support member 13 in telescopic fashion to close or reduce the gap R until, with the expansion anchor set to the required loading in the socket, the sleeve 12 comes into or substantially into abutment with the sleeve 1, and the object to be clamped, normally between the washer and the end of the sleeve 12, is brought firmly into contact with the bare material. In this position the relative dimensions of the component parts may be such that the member 13 is in contact with or substantially in contact with the expansion body 6, and the collar 14 similarly with the support member 13, thus providing solidity to the anchor bolt.

In an alternative embodiment the collar 14 of the arrangement shown in FIG. 2, may have a diameter greater than that of the linking tubular support member 13. This provides a tapering effect to the outer sleeve 12 so that in use the sleeve 12 grips the receiving socket for the fixing thus preventing the sleeve 12 and collar 14 together with the support member 13 from falling out or being readily removed from the socket if rod 15 should be removed to release the object being clamped.

Further the sleeve 12 and collar 14 may be dispensed with and the linking support member mounted within the sleeve 1 and in abutment with the head of the rod 15, the distance R then corresponding to the spatial extent between the abutment provided by the end of the sleeve 1 and that provided by the washer 17 at the head of the bolt 15.

The relative dimensions of the sleeve 1 and support member 13 may be such that in the fully torqued-up condition of the anchorage bolt with the object to be clamped pulled hard against the bare material, the member 13 has been moved, during axial movement of the bolt 15 in expansion body 6, into or substantially into abutment with the expansion body 6, thus providing as with the FIG. 2 embodiment solidity to the expansion anchor, since the space between the sleeve and the shank of the rod 15 is occupied or substantially occupied by the material of the member 13 and the expansion body 6.

This is of great importance to enable the anchor to withstand high shear loads. Moreover since no loading of the linking support member 13 occurs during torque-up, the anti-vibrational properties of the fixing as a whole are maximized, because the expended effort is wholly used to set the anchor in the receiving socket and clamp the object hard against the bare material.

Other variations of the embodiments as described above will be apparent to those skilled in the art within the scope of the present inventive disclosure.

For example in the FIG. 2 embodiment inter-engageable gripping means could be provided between the linking support member 13 and the respective sleeves 1 and 12 so that in the set position of the fixing the sleeve 12 could be retained within the receiving socket if the bolt 15 were subsequently removed.

Figure 3:
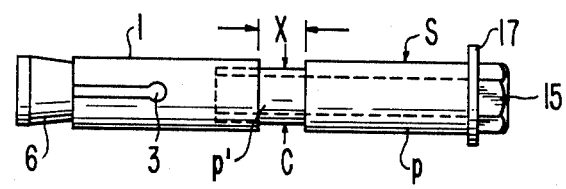
FIG. 3 is a side view of an expansion anchor assembly according to another embodiment of the invention.

A further embodiment of the invention is shown in FIG. 3.

Figure 4:
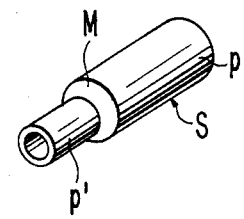
FIG. 4 is a perspective view of the spacer element used in the embodiment of FIG. 3.

In this embodiment instead of incorporating a pair of telescoping spacer members 12,13 between the head of the anchor rod 15 for setting the expansion anchor and the expansion body 6, as shown in FIG. 2, a solid thick walled tubular spacer S (shown in FIG. 4) may be employed. The spacer S is one-piece or unitary.

The tubular spacer S has a first part P of greater diameter than its remaining part P', with the part P' in slide fit engagement in the expansion sleeve 1, and the part P abutting, at its free end, the washer 17 and the head of the anchor rod 15.

The annular rim M formed between the parts P and P' of the spacer S, is arranged, prior to use, a distance X from the expansion sleeve 1.

As clamping down is performed in a receiving socket, the spacer part P' slides inside the expansion sleeve, progressively closing the gap X. The arrangement may be so designed that in any particular application, the rim M never or at the most just comes into contact with the expansion sleeve 1 so avoiding uselessly and detrimentally loading the spacer S as hereinbefore mentioned.

I claim:

1. An expansion anchor assembly comprising a tubular expansion sleeve having a plurality of slits extending longitudinally of the sleeve from a front end thereof to provide an expansible front portion of said sleeve; a threaded expansion body mounted at said front end of said sleeve and movable longitudinally into said sleeve to expand said front portion of said sleeve; a one-piece tubular spacer member having a front portion of outer diameter slightly less than the inner diameter of said expansion sleeve axially slidably received within a rear end of said expansion sleeve, a rear portion of outer diameter greater than the inner diameter of said expansion sleeve extending a substantial distance longitudinally rearward from a rear end of said expansion sleeve, and an annular shoulder surface connecting said front portion of said rear portion; and an anchor bolt having a head disposed rearwardly of a free end of said rear portion of said spacer member and a shank which extents internally of said spacer member and said expansion sleeve into threaded engagement with said expansion body, said bolt being rotatable to draw said expansion body into said expansion sleeve to effect expansion of said front portion of said expansion sleeve and to slide said front portion of said one-piece tubular spacer member axially within said sleeve toward said expansion body, and wherein said slits, said expansion body, and said front portion of said spacer member are dimensioned in the longitudinal direction of the assembly such that in a fully set condition of said assembly said expansion body is abutted with a free end of said front portion of said spacer member with said annular shoulder surface disposed next to said rear end of said sleeve but no more than barely contacting said rear end of said sleeve.

2. An expansion anchor assembly according to claim 1, wherein said rear portion of said spacer member is of substantially the same outer diameter as said expansion sleeve.

3. An expansion anchor assembly according to claim 1, wherein said rear portion of said spacer member is of a length which is substantial in comparison with that of said expansion sleeve.

4. An expansion anchor assembly according to claim 3, wherein the length of said rear portion of said spacer member is at least about the same as that of said expansion sleeve.

* * * * *